June 10, 1958  J. B. DES ROSIERS  2,838,139
SELF-ENERGIZING BRAKE
Filed Aug. 19, 1953  5 Sheets-Sheet 5
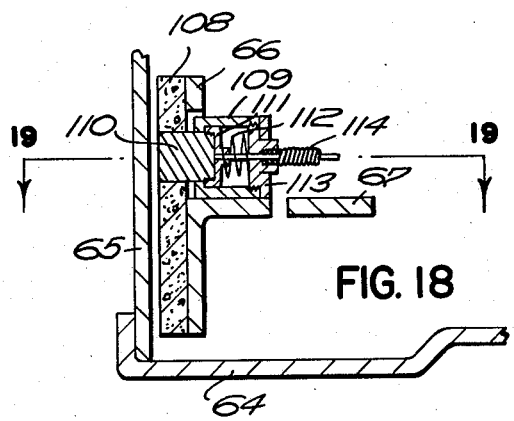
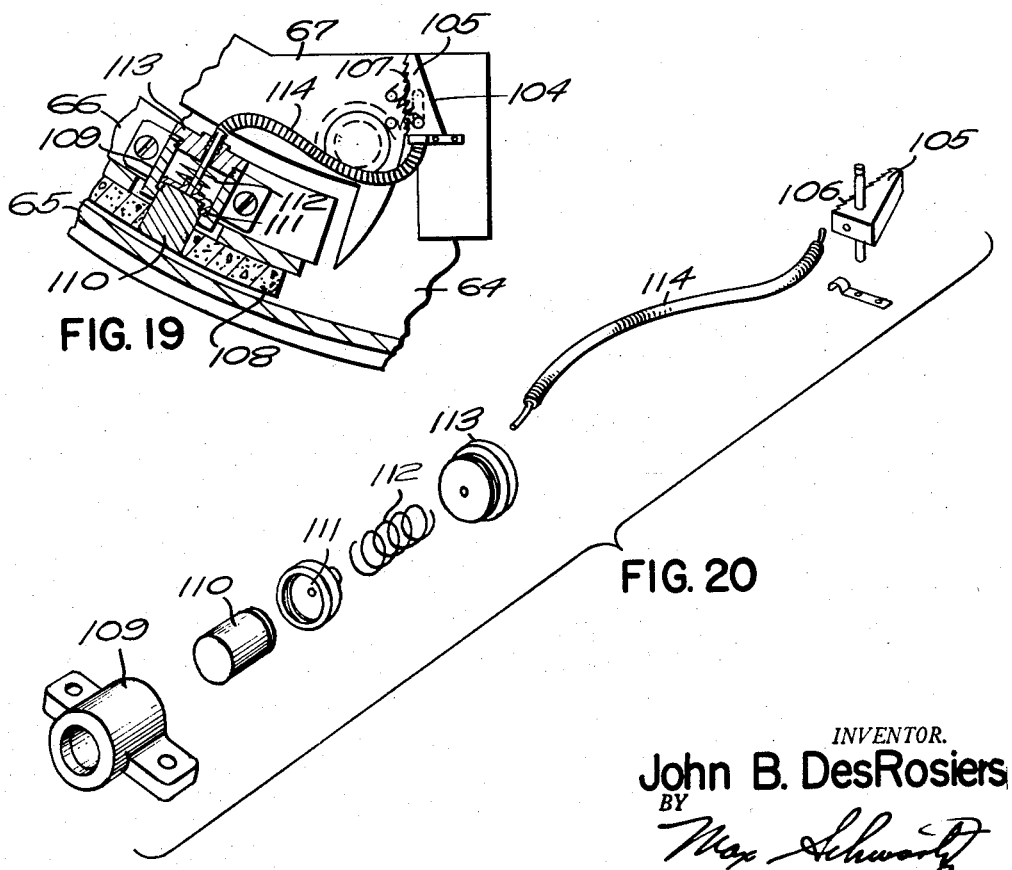
INVENTOR.
John B. DesRosiers
BY
ATTORNEY : # United States Patent Office

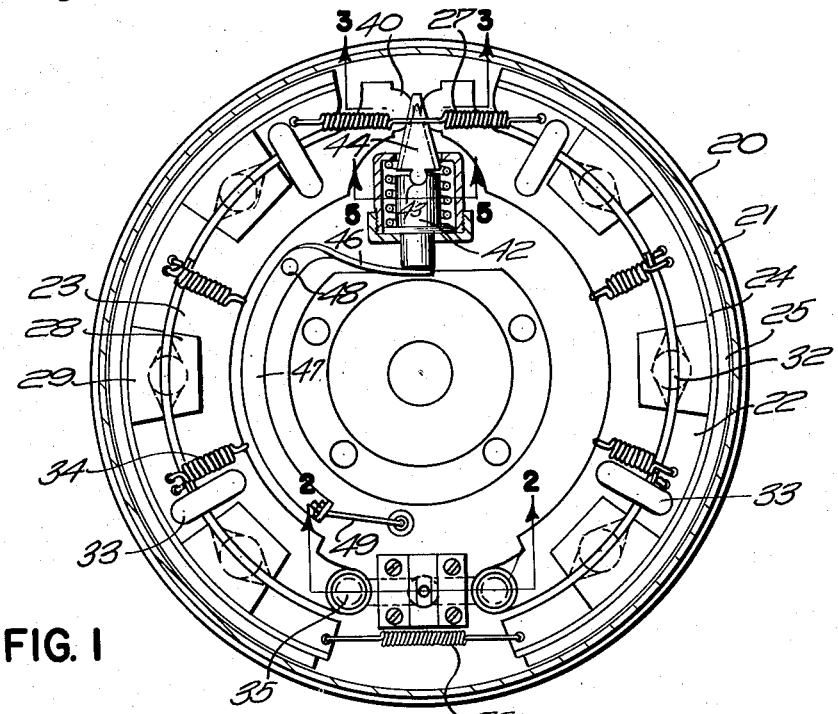

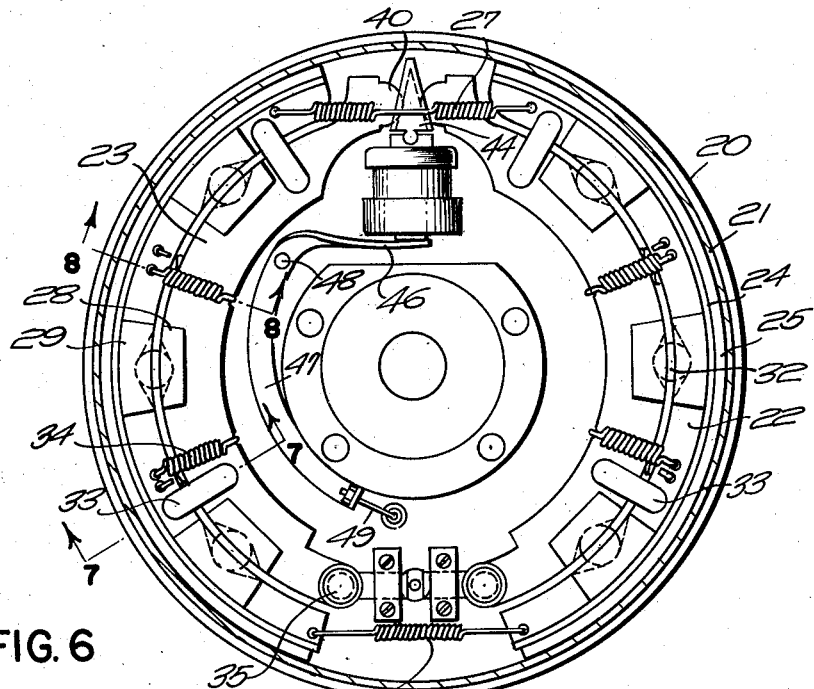
FIG. 6
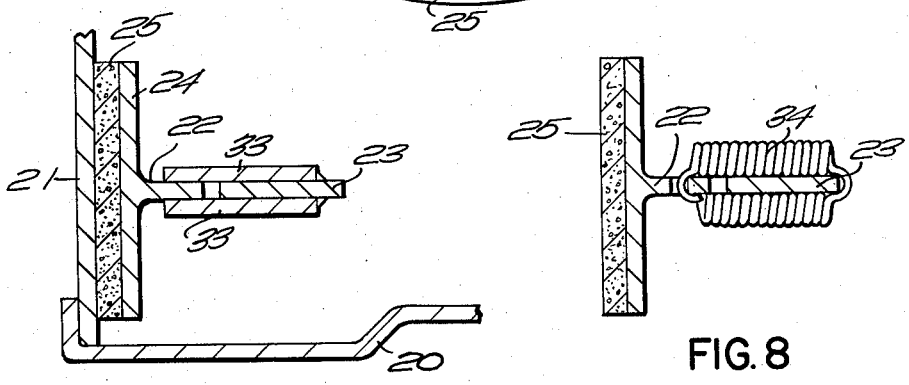
FIG. 7
FIG. 8
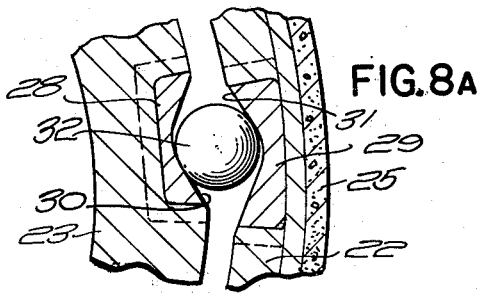
FIG. 8A

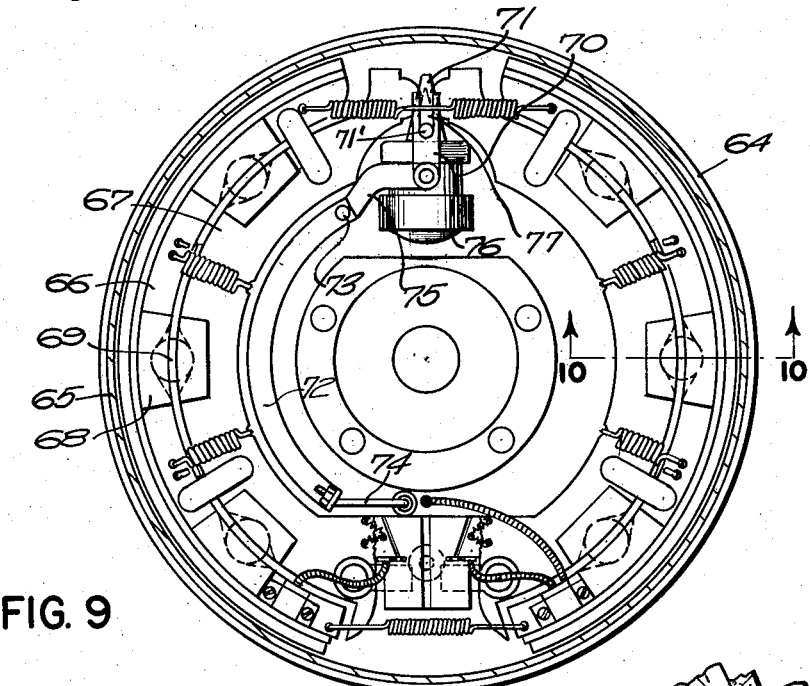
FIG. 9
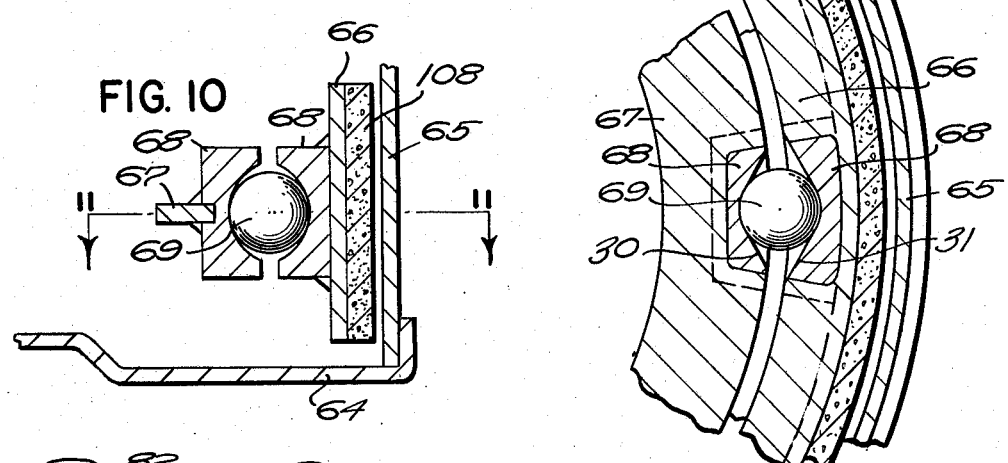
FIG. 10
FIG. 11
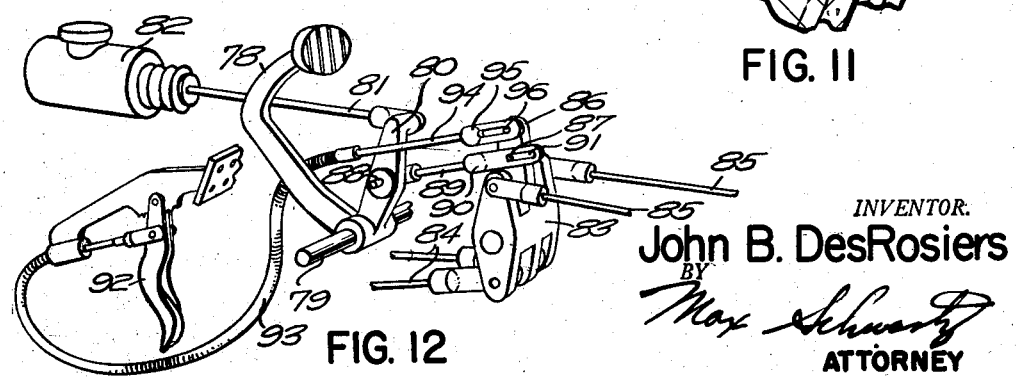
FIG. 12
INVENTOR.
John B. DesRosiers
BY
ATTORNEY

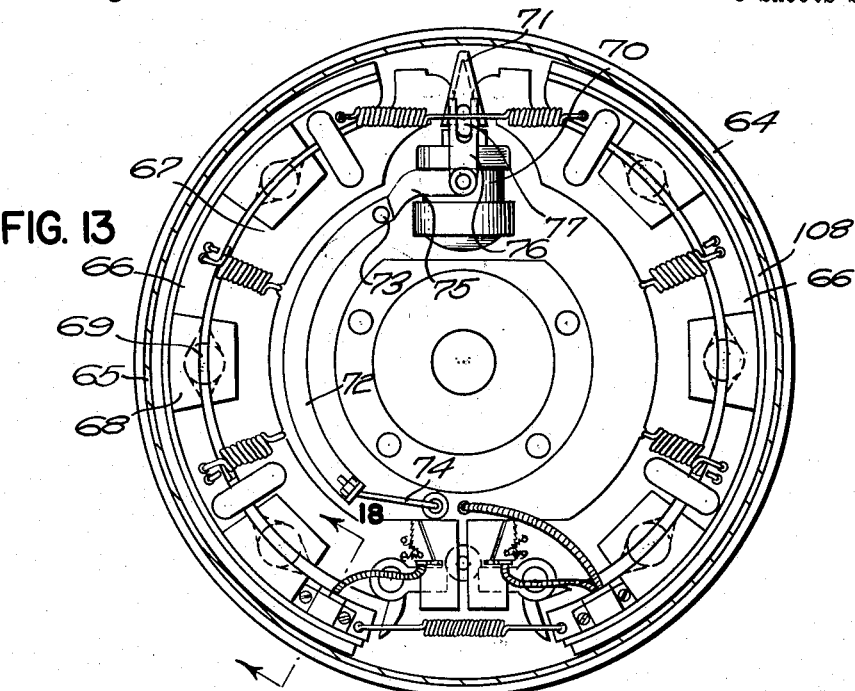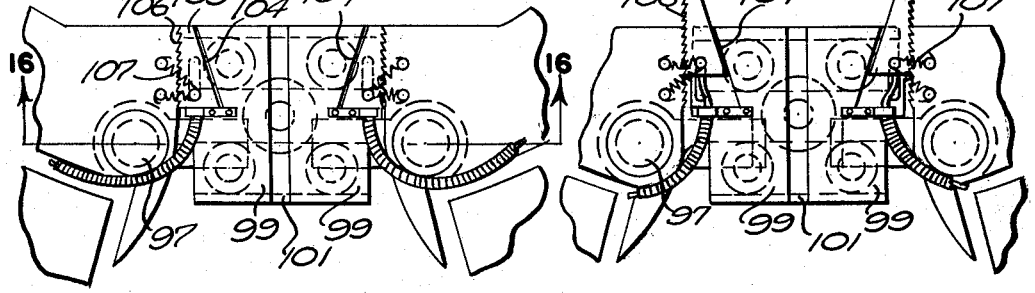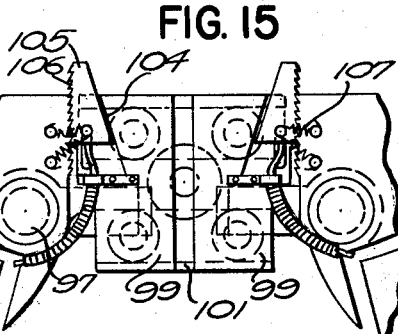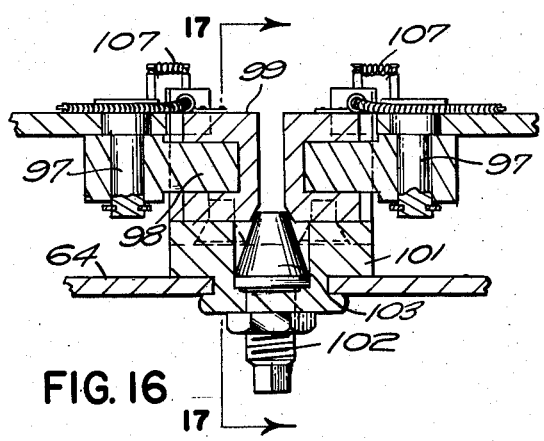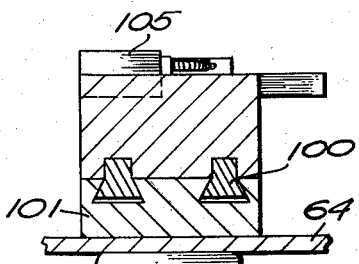

2,838,139
Patented June 10, 1958

2,838,139

SELF-ENERGIZING BRAKE

John B. Des Rosiers, Providence, R. I.

Application August 19, 1953, Serial No. 375,159

9 Claims. (Cl. 188—74)

The present invention relates to automotive braking mechanisms and more particularly to a self-energizing brake.

The principal object of the present invention is to provide a brake for an automotive or similar vehicle which is self-energizing.

Another object of the present invention is to provide a brake having a floating shoe permitting a uniform and equal application of the brake.

A further object of the present invention is to provide a brake which is readily adaptable to hydraulic or mechanical operation, or a combination of both.

Another object of the present invention is to provide a self-energizing brake which is also self-adjusting.

Another object of the present invention is to provide a self-energizing brake which is readily adaptable to the present type of brake and wheel assemblies.

With the above and other objects and advantageous features in view, my invention consists of a novel arrangement of parts more fully disclosed in the detailed description following in conjunction with the accompanying drawings, and more particularly defined in the appended claims.

In the drawings:

Fig. 1 is a plan view of a mechanically operated brake embodying my invention.

Fig. 2 is a section taken on line 2—2 on Fig. 1.

Fig. 3 is a section taken on line 3—3 on Fig. 1.

Fig. 4 is a perspective view showing the hand and pedal operating assembly.

Fig. 5 is a section taken on line 5—5 on Fig. 1.

Fig. 6 is a view similar to Fig. 1 with the brake in "on" position.

Fig. 7 is a section taken on line 7—7 on Fig. 6.

Fig. 8 is a section taken on line 8—8 on Fig. 6.

Fig. 8A is an enlarged detailed section showing the position of the brake shoes in "on" position.

Fig. 9 is a plan view of a combination mechanical and hydraulically operated brake embodying my invention.

Fig. 10 is a section taken on line 10—10 on Fig. 9.

Fig. 11 is a section taken on line 11—11 on Fig. 10.

Fig. 12 is a perspective view of the hand and foot pedal operating assembly for the brake shown in Fig. 9.

Fig. 13 is a view similar to Fig. 9 with the brake in "on" position.

Fig. 14 is an enlarged view of the self-adjusting mechanism.

Fig. 15 is a view similar to Fig. 14 with the parts in adjusting position.

Fig. 16 is a section taken on line 16—16 on Fig. 14.

Fig. 17 is a section taken on line 17—17 on Fig. 16.

Fig. 18 is a section taken on line 18—18 on Fig. 13.

Fig. 19 is a section taken on line 19—19 on Fig. 18.

Fig. 20 is an exploded view of the adjusting mechanism assembly.

Automotive vehicles were originally equipped with hand-operated brakes which were positioned on the rear wheels only. As the weight, speed and horsepower of the cars increased, it was necessary to increase the braking action. First, the brakes were positioned on all four wheels. Then the brake bands and shoes were enlarged to provide additional braking surface. Then hydraulic operation was introduced so that added pressure could be brought on the brakes with the same foot pressure. The automotive industry is now producing cars that are heavier, more powerful, and faster than ever produced before. Braking these cars has become a problem. Some cars have reorganized the brake completely and have introduced disc brakes. At the present time, these are costly and take up a great deal of room so that they are only used on the larger cars. Another development has been the power brake. This is also costly. The present invention is designed to provide a self-energizing brake which will give tremendous braking force with a minimum of foot pressure. The construction of the present invention is such that it can readily be applied to the existing type of conventional brakes and can be operated either mechanically or hydraulically, or by a combination of both.

In addition to the foregoing, the brake of the present invention also can be made self-adjusting. An extremely powerful brake is thus provided in a modification of the standard brake requiring only a slight addition cost. The main feature of the present invention is the provision of a floating brake shoe which ensures an even braking contact along the entire surface of the brake, and which is self-energizing.

Referring more in detail to the drawings illustrating my invention, Figs. 1 and 6 ilustrate the basic principles of operation of a brake embodying the present invention in a simplified form and mechanically operated. The brake includes a conventional type backing plate 20 and brake drum 21 which is mounted on the wheel for rotation therewith. The brake shoes and energizing assembly are conventionally mounted on the backing plate 20.

Referring to Fig. 1, the brake comprises a pair of arcuate shoes pivoted at their bottom ends and energized by spreading at their top ends. Each shoe comprises an outer floating section 22 and an inner actuating section 23. The outer section 22 is provided at its periphery with an integral flanged portion 24 carrying the brake lining 25. The floating shoe portion 22 with its supplemental parts is thus the portion that contacts the drum 21 to stop the vehicle. The lower ends of the oppositely disposed floating shoe portions 22 are connected by a come-back spring 26 and the upper ends are also connected by a similar spring 27.

The actuating shoe portions 23 comprise flat arcuate plates spread from the floating portions 22 and in the same plane. The shoe portions 22 and 23 are provided with complementary blocks 28 and 29. (See Fig. 8A.) These blocks 28 and 29 are set at spaced intervals as shown in Fig. 1, three on each shoe being illustrated. The blocks 28 and 29 are provided with V-shaped oppositely disposed recesses 30 and 31 forming a pocket in which a steel ball 32 is positioned. The ball 32 permits the floating shoe 22 to ride on the actuating shoe 23. Pairs of spaced clips 33 are welded or otherwise secured to the actuating shoe 23 to guide the movement of the floating shoe in planetary alignment with the actuating shoe. The shoe portions 22 and 23 are retained in contact with the steel balls 32 by means of spaced springs 34 which extend around the actuating shoe portion 23 as shown in Fig. 8, and are connected into openings in the floating shoe portion 22. This provides an even spring pull on both sides of the shoe portion.

The lower ends of the actuating shoe portions 23 are each pivotally attached, as by means of the pins 35, to bars 36 which are slidable towards and from each other in a block 37 as shown in Fig. 2. A manually operable screw 38 extends through the block 37 and is provided with a conical head 39 which drives between the ends of the bars 36. This permits manual adjustment of the actuating brake shoes 23 by allowing the pivot pins 35 to be moved apart, thus moving the shoes nearer to the rotating drum 21.

The application of the braking power is directed to the upper ends 40 of the actuating shoes 23. In the form shown in Figs. 1 and 6, this force is mechanically applied. A housing 41 is mounted on the backing plate 20 and carries a spring pressed plunger 42. The upper end of the plunger 42 is provided with a socket 43 in which a wedge 44 is mounted. The wedge 44 is provided with grooves 45 on either side in which the ends 40 of the actuating shoes 23 slide. (See Fig. 3.) The lower attenuated end of the plunger 42 projects downwardly from the housing and bears against a short arm 46 of a lever 47 which is pivoted as at 48 to the backing plate 20. A Bowden cable 49 is attached to the opposite end of the lever 47 through the backing plate and thence to one of the brake actuating rods.

With the parts assembled as herein above described, the operation of the brake is shown in Figs. 1, 6 and 8A. Assuming that the brake drum 21 is rotating in a clockwise direction, actuation of the brake rod will cause the cable 49 to pull the lever 47 into the position shown in Fig. 6. Movement of the lever 47 about its pivot 48, will cause its arm 46 to push the plunger 42 upwardly. The ends 40 of the actuating shoes 23 will be pushed apart by the wedge 44. This movement continues until the brake lining 25 on the floating shoes 22 contacts the rotating drum 21. The frictional engagement will cause the floating shoes to move on the balls 32 in a clockwise direction. Since the pockets in which the balls 32 are locked are provided with inclined wall surfaces 30 and 31, a spreading action develops between the floating and actuating shoe causing the floating shoe to wedge tightly against the rotating drum 21. The tighter the frictional engagement, the tighter the wedging and therefore the braking action. A light touch on the brake will therefore cause the floating shoe to move with the brake drum and become self-energized. If the car is moving in reverse, the shoes 22 will float in the opposite direction and the same wedging and self-energizing action will again occur.

When the brake is released, the springs 26 and 27 and the springs 34 will bring the shoe portions 22 and 23 back into the position shown in Fig. 1. The spacing and size of the steel balls 32 is so arranged that the entire surface of the lining 25 on each shoe will contact the brake drum, thus ensuring maximum efficiency and utilization of the entire braking surface.

From the above, it can readily be seen that it is merely necessary to provide sufficient pressure to move the actuating shoe portions 23 apart sufficiently for the lining 25 to contact the rotating drum 21. From that point on, the floating shoe 22 will move with the drum and become self-energized to apply the brake.

Referring to Fig. 4 the hand and foot brake assembly may be set up as shown herein. A multiple rocker arm 50 is mounted on a shaft 51; the lower arms being connected to a pair of brake rods 52 extending towards the two front wheels of the vehicle, and the upper arms being connected to a pair of brake rods 53 extending towards the two rear wheels of the vehicles. A large actuating arm 54 extends from the upper central portion of the rocker arm 50. The foot brake pedal 55 is connected to a rod 56 having an elongated slot 57 at the free end surrounding a pin 58 attached to the arm 54. The hand brake 59 is connected through a Bowden cable 60 to a head 61 also provided with an elongated slot 62 in which a pin 63 on the arm 54 is slidable. It can thus be seen that pressure on the foot pedal 55 will cause the rocker arm 50 to swing towards the left to apply the brakes. However, the pin 63 will slide in the slot 62 in a lost motion and will not disturb the hand brake 59. Conversely, when the hand brake 59 is applied and the rocker arm 50 again moves to the left to apply the brake, the pin 58 will slide in a slot 57 in a lost motion and the foot pedal 55 will not be disturbed.

The construction above described also readily lends itself to hydraulic operation. In such cases the wedge 44 may be hydraulically operated from a conventional hydraulic cylinder and brake assembly. For safety's sake, it is advisable to provide for both mechanical and hydraulic operation with the mechanical operation taking hold should the hydraulic operation fail. Such a construction is shown in Figs. 9, 12, and 13.

Referring to Fig. 9, the general brake assembly is identical with that shown in Fig. 1. The backing plate 64 and brake drum 65 is assembled with the floating shoe portion 66 and actuating shoe portion 67. The blocks 68 and steel balls 69 operate in the identical manner as above described in Fig. 1. However, to actuate the brake, I provide a hydraulic cylinder 70 which operates the wedge 71 in applying the brakes. In addition, the mechanical lever 72 is pivoted on the backing plate as at 73 and is operated by a Bowden cable 74. The lever 72 operates in the same manner as the lever 47 in Fig. 1. The end 75 of the lever 72 is provided with a link 76 having an upper arcuate cut-out slot 77 which rests under a pin 71' in the wedge 71.

Thus when the hydraulic cylinder moves the wedge upwardly to actuate the brake, the pin moves with it in the slot 77 and the mechanical lever 72 is undisturbed. When the lever 72 is actuated, the link 76 moves upwardly against the pin which moves the wedge 71 upwardly to apply the brake as shown in Fig. 13. To combine the two operations with the hand and foot levers, the actuating assembly shown in Fig. 12 may be used. The foot brake pedal 78 is mounted on a shaft 79 and the arm 80 is connected by a rod 81 to the hydraulic cylinder 82 which operates a conventional hydraulic braking system. In addition, a multiple rocker arm 83 is connected by rods 84 and 85 to the front and rear wheels for the mechanical operation of the brakes. A large arm 86 extends from the upper end of the rocker arm 83 and is provided with a pin 87. The foot pedal arm 80 is provided with a pivoted connection 88 intermediate its ends. The connection 88 is connected to a rod 89 having a head 90 in which is formed a slot 91 which surrounds the pin 87 and is positioned so that the pin is to the left end of the slot as shown in Fig. 12.

When the pedal 78 is moved, the arm 80 will cause the hydraulic brake to be applied. During this motion the pin 87 will move to the rear end of the slot and the mechanical brakes will be untouched. However, if the hydraulic system fails, then further movement of the pedal 78 will cause the head 90 to pull on the pin 87 and the rocker arm 83 will turn and apply the mechanical brakes. In addition, the hand lever 92 is connected by a Bowden cable 93 to a rod 94 having a slotted head 95 surrounding a pin 96 in the arm 86. If the brake is applied mechanically, the lost motion of the pin 96 in the slot will not disturb the hand brake. If the hand brake 92 is applied, the mechanical brakes will go on and the foot pedal will also be moved. It should be noted that in the construction shown in Figs. 4 and 12, the so-called parking brake actually operates on the wheels of the vehicle and can be used as an emergency. The combination of mechanical and hydraulic operation provides a highly desirable safety feature.

The brake of the present invention may also be equipped with an automatic adjusting device. However, to make the proper adjustment the device must contact the drum through the floating shoe, but the adjustment must be made on the actuating shoe. Such a device is shown in Figs. 9 and 13 to 20 inclusive. The lower ends of the actuating shoes 67 are pivotally connected, as at 97, to blocks 98 which are slidably mounted in blocks 99, which in turn are keyed as at 100 for sliding movement on block 101. An adjusting screw 102 is provided with a conical head 103 so that it can be manually forced between the blocks 99 which in turn will force the blocks 98 and pivot points 97 apart as shown in Fig. 16, for making a manual adjustment. However, the upper portions of the blocks 99 are provided with inclined surfaces 104 and a wedge-shaped member 105 is mounted with one edge bearing against the surface 104 and the other edge being provided with ratchet teeth 106 and bearing against the correspondingly toothed edge of the actuating shoes as shown in Figs. 14 and 15. The wedge 105 may be held in engagement with the end of the actuating shoes 67 by springs 107. Examining Figs. 14 and 15 it is obvious that inward movement of the wedge 105 will cause the actuating shoes to move away from the blocks 99, the blocks 98 sliding outwardly.

This movement of the wedges 105 corresponds to the wear on the lining 108 on the floating shoe 66. Referring to Figs. 18, 19, and 20, a cylinder 109 is mounted on the floating shoe 66 and a pin or plug 110 is slidable in the cylinder through an opening in the lining 108 up to the outer surface of the lining. The plug 110 is retained in a cap 111 pushed inwardly by a spring 112 which is in turn held in place by the cover 113 which is screwed onto the back of the cylinder 109. A Bowden cable 114 passes through the cover 113 and is connected to the cap 111. The other end of the Bowden cable is connected to the wedge 105. With the parts thus positioned, the wear on the lining 108 will cause the pin 110 to be pushed inwardly by the drum 65. This motion will be transmitted through the cable 114 to the wedge 105 causing an adjustment which will spread the actuating shoes 67 and move them towards the drum. In this manner the space between the lining 108 and the drum 65 will always be maintained regardless of the wear on the lining. The adjustment is thus completely automatic.

I have thus provided a complete brake assembly which is readily adaptable to the conventional drum brakes now in use. The brake is a floating self-energizing construction which produces a great deal of braking power with a minimum of foot pressure. Both mechanical and hydraulic actuation is possible, or a combination of both as shown. The brake also can be made self-adjusting as herein described. While the invention has been described as applied to an automotive vehicle, it is obvious that the brake can readily be applied to any other vehicle such as a railroad car. Other advantages of the present invention will be readily apparent to a person skilled in the art.

I claim:

1. A self-energizing brake installation for automotive vehicle wheels and the like, said installation comprising, in combination, a brake drum secured to the wheel and having an annular flange projecting therefrom, a fixed backing plate for supporting brake shoes in proximity to the brake drum, a pair of approximately semi-circular brake shoes, said brake shoes arranged in complementary position and between them covering nearly the entire arc of said drum flange, means pivotally mounting the adjacent ends of said shoes on said backing plate at one side of the installation, operating means for swinging said shoes in mutually opposite directions about said pivoting means to apply and release the brakes; each of said brake shoes comprising an approximately semi-circular actuating member and an approximately semi-circular full-floating drum-flange-engaging member, said last named associated members being substantially conterminous and occupying similar substantially concentric arcs, the drum engaging member being mounted in a position radially outward from said actuating member and between the latter member and the drum flange; means mounting said engaging member upon said actuating member for relative translatory movement only as distinguished from pivotal or rocking movement, said last named means comprising parts disposed in supporting relation between said drum engaging member and said actuating member, at least a portion of said parts adapted to move during operation of the brakes in a path which is not concentric with respect to the arcs of curvature of said members, whereby said mounting means is adapted to cause generally radial separation of said members upon the occurrence of relative angular movement thereof about their center of curvature, as when initial contact of said engaging member with said brake drum flange upon application of the brake causes retardation of said member, thus effecting increased pressure of application by self-energization the means mounting each of the engaging members upon its actuating member for translatory movement being multiple and spaced apart along the arcs of the brake shoes, the successive mounting means along each shoe varying progressively in extent of radial movement afforded, to compensate for their respective distances from the pivot point of the shoe, and thus for the different angularity of the engaging members of the shoe with relation to the brake drum flange at such points.

2. The brake installation as set forth in claim 1 in which the engaging member mounting means each comprises mutually facing V-shaped notches formed respectively in the engaging and actuating members at spaced points therealong and spherical rolling elements confined within said mutually facing notches, the said spherical elements being progressively larger in diameter along the arcuate length of the shoe.

3. A self-energizing brake installation for automotive vehicle wheels and the like, said installation comprising, in combination, a brake drum secured to the wheel and having an annular flange projecting therefrom, a fixed backing plate for supporting brake shoes in proximity to the brake drum, a pair of approximately semi-circular brake shoes, said brake shoes arranged in complementary positions and between them covering nearly the entire arc of said drum flange, means pivotally mounting the adjacent ends of said shoes on said backing plate at one side of the installation, operating means for swinging said shoes in mutually opposite directions about said pivoting means to apply and release the brakes; each of said brake shoes comprising an approximately semi-circular actuating member and an approximately semi-circular full-floating drum-flange-engaging member, said last named associated member being substantially conterminous and occupying similar substantially concentric arcs, the drum engaging member being mounted in a position radially outward from said actuating member and between the latter member and the drum flange; means mounting said engaging member upon said actuating member for relative translatory movement only as distinguished from pivotal or rocking movement, said last named means comprising mutually facing V-shaped surfaces provided respectively on the actuating member and the engaging member, said surfaces being formed on separate inserts socketed into said two members and a spherical rolling element confined within said notches and supporting said engaging member upon said actuating member, whereby said mounting means is adapted to cause generally radial separation of said members upon the occurrence of relative angular movement thereof about their center of curvature, as when initial contact of said engaging member with said brake drum flange upon application of the brake causes retardation of said member, thus effecting increased pressure of application upon self-energization.

4. A self-energizing brake installation for automotive vehicle wheels and the like, said installation comprising, in combination, a brake drum secured to the wheel and having an annular flange projecting therefrom, a fixed backing plate for supporting brake shoes in proximity to the brake drum, a plurality of arcuate brake shoes, means pivotally mounting the adjacent ends of two of said shoes on said backing plate, operating means for moving said shoes outwardly in opposite directions about said pivotal mounting means to apply and release the brake; a brake lining on the outer surface of said shoe, said brake lining being of conventional material subject to gradual wear, a radially movable plug carried by said shoe and positioned so that it is brought into contact with the brake drum simultaneously with the contacting of the drum by the brake lining, means located adjacent the means for pivotally mounting each of said shoes for adjusting said mounting a degree toward said brake drum to compensate for wear, and an operative connection between said plug and said pivotal moving means.

5. A self-energizing brake installation for automotive vehicle wheels and the like, said installation comprising, in combination, a brake drum secured to the wheel and having an annular flange projecting therefrom, a fixed backing plate for supporting brake shoes in proximity to the brake drum, a plurality of arcuate brake shoes, means pivotally mounting the adjacent ends of two of said shoes on said backing plate, operating means for moving said shoes outwardly in opposite directions about said pivotal mounting means to apply and release the brake; each of said brake shoes comprising an arcuate actuating member and a full-floating drum-flange-engaging member, said last named associated members occupying similar substantially concentric arcs, the drum engaging member being mounted in a position radially outward from said actuating member and between the latter member and the drum flange; means mounting said engaging member upon said actuating member for relative movement only as distinguished from pivotal or rocking movement, a brake lining on the outer surface of said engaging member of the shoe, said brake lining being of conventional material subject to gradual wear, a radially movable plug carried by said actuating member and positioned so that it is brought into contact with the brake drum simultaneously with the contacting of the drum by the brake lining, said plug being of harder material than that of said lining and more resistant to abrasion, wedging means located adjacent the means for pivotally mounting each of said shoes for adjusting said mounting a degree toward said brake drum to compensate for wear, and an operative connection between said plug and said wedging means.

6. A self-energizing brake installation for automotive vehicle wheels and the like, said installation comprising, in combination, a brake drum secured to the wheel and having an annular flange projecting therefrom, a fixed backing plate for supporting brake shoes in proximity to the brake drum, a pair of approximately semi-circular brake shoes, said brake shoes arranged in complementary positions and between them covering nearly the entire arc of said drum flange, means pivotally mounting the adjacent ends of said shoes on said backing plate at one side of the installation, operating means for swinging said shoes in mutually opposite directions about said pivoting means to apply and release the brakes; said pivotally mounting means comprising spaced-apart pivot elements adjustably carried by said backing plate upon which the respective shoes swing, a brake lining carried by the outer surface of each shoe for contacting the brake drum, and means individual to each of the pivot elements for moving it away from the other pivot element to individually alter the brake lining clearance of its associated shoe as for compensating for wear, a plug slidably carried by each shoe adjacent the brake lining and having a face adapted to contact a brake drum simultaneously with the lining, said plug being more resistant to wear than said lining, means for operatively connecting said plug to said pivot element to adjust the latter as gradual wear of said lining increases the travel of said plug relatively to said shoe on each application of the brake.

7. A self-energizing brake installation for automotive vehicle wheels and the like, said installation comprising, in combination, a brake drum secured to the wheel and having an annular flange projecting therefrom, a fixed backing plate for supporting brake shoes in proximity to the brake drum, a pair of approximately semi-circular brake shoes, said brake shoes arranged in complementary positions and between them covering nearly the entire arc of said drum flange, means pivotally mounting the adjacent ends of said shoes on said backing plate at one side of the installation, operating means for swinging said shoes in mutually opposite directions about said pivoting means to apply and release the brakes; said pivotally mounting means comprising spaced apart pivotal elements adjustably carried by said backing plate upon which the respective shoes swing, a brake lining carried by the outer surface of each shoe for contacting the brake drum, manually operable means for spreading said pivot elements apart for primary adjustment of the brake lining clearance, and means individual to each of the pivot elements for moving it away from the other pivot element to individually alter the brake lining clearance of its associated shoe as for compensating for wear, a plug slidably carried by each shoe adjacent the brake lining and having a face adapted to contact a brake drum simultaneously with the lining, said plug being more resistant to wear than said lining, ratchet means for operatively connecting said plug to said pivot element to adjust the latter progressively as gradual wear of said lining increases the travel of said plug relatively to said shoe on each application of the brake.

8. A self-energizing brake installation for automotive vehicle wheels and the like, said installation comprising, in combination, a brake drum secured to the wheel and having an annular flange projecting therefrom, a fixed backing plate for supporting brake shoes in proximity to the brake drum, a pair of approximately semi-circular brake shoes, said brake shoes arranged in complementary positions and between them covering nearly the entire arc of said drum flange, means pivotally mounting the adjacent ends of said shoes on said backing plate at one side of the installation, operating means for swinging said shoes in mutually opposite directions about said pivoting means to apply and release the brakes; said pivotally mounting means comprising spaced-apart pivot elements adjustably carried by said backing plate upon which the respective shoes swing, supporting blocks carried by said backing plate for respectively supporting said pivot elements, a brake lining carried by the outer surface of each shoe for contacting the brake drum, and means individual to each of the pivot elements for moving it away from the other pivot element to individually alter the brake lining clearance of its associated shoe as for compensating for wear, said last named means comprising an inclined surface on each of said supporting blocks and a mating surface on the adjacent portion of the adjoining one of said shoes, a plug slidably carried by each shoe adjacent the brake lining and having a face adapted to contact a brake drum simultaneously with the lining, said plug being more resistant to wear than said lining, and means for operatively connecting said plug to said wedge element to adjust the latter as gradual wear of said lining increases the travel of said plug relatively to said shoe on each application of the brake.

9. A self-energizing brake installation for automotive vehicle wheels and the like, said installation comprising, in combination, a brake drum secured to the wheel and having an annular flange projecting therefrom, a fixed backing plate for supporting brake shoes in proximity to the brake drum, a pair of approximately semi-circular brake shoes, said brake shoes arranged in complementary positions and between them covering nearly the entire arc of said drum flange, means pivotally mounting the adjacent ends of said shoes on said backing plate at one side of the installation, operating means for swinging said shoes in mutually opposite directions about said pivoting means to apply and release the brakes; said pivotally mounting means comprising spaced-apart pivot elements adjustably carried by said backing plate upon which the respective shoes swing, supporting blocks carried by said backing plate for respectively supporting said pivot elements, means for moving said blocks apart to simultaneously spread the pivot elements further apart, a brake lining carried by the outer surface of each shoe for contacting the brake drum, and means individual to each of the pivot elements for moving it away from the other pivot element to individually alter the brake lining clearance of its associated shoe as for compensating for wear, said last named means comprising an inclined surface on each of said supporting blocks and a mating surface on the adjacent portion of the adjoining one of said shoes, a plug slidably carried by each shoe adjacent the brake lining and having a face adapted to contact a brake drum simultaneously with the lining, said plug being more resistant to wear than said lining, and means for operatively connecting said plug to said wedge element to adjust the latter as gradual wear of said lining increases the travel of said plug relatively to said shoe on each application of the brake, ratchet teeth on the mutually engaging surfaces of said shoe and said wedge element to prevent retrograde movement between the two after wear adjustment to the extent of one ratchet tooth.

References Cited in the file of this patent

UNITED STATES PATENTS

| | | |
|---|---|---|
| 1,729,391 | Land | Sept. 24, 1929 |
| 2,147,955 | Baits | Feb. 21, 1939 |
| 2,154,636 | Nickell | Apr. 18, 1939 |
| 2,191,429 | Jenkins et al. | Feb. 20, 1940 |
| 2,201,612 | Fields | May 21, 1940 |
| 2,243,469 | Moore | May 27, 1941 |
| 2,555,651 | Lambert et al. | June 5, 1951 |
| 2,569,012 | Lauer | Sept. 25, 1951 |

FOREIGN PATENTS

| | | |
|---|---|---|
| 661,547 | France | Mar. 5, 1929 |
| 638,960 | Great Britain | June 21, 1950 |